US011220059B2

(12) United States Patent
Anapolsky (10) Patent No.: US 11,220,059 B2
(45) Date of Patent: Jan. 11, 2022

(54) ULTRA-STRONG 2-MANIFOLD PANELS BASED ON BIOMIMETIC INSPIRED, ALGORITHMICALLY OPTIMIZED STRUCTURES

(71) Applicant: Toyota Research Institute, Inc., Los Altos, CA (US)

(72) Inventor: Abraham S. Anapolsky, San Mateo, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 638 days.

(21) Appl. No.: 15/882,436

(22) Filed: Jan. 29, 2018

(65) Prior Publication Data

US 2019/0232563 A1 Aug. 1, 2019

(51) Int. Cl.
*B29C 64/393* (2017.01)
*B29C 64/10* (2017.01)
(Continued)

(52) U.S. Cl.
CPC ............ *B29C 64/393* (2017.08); *B29C 64/10* (2017.08); *B33Y 10/00* (2014.12); *B33Y 50/02* (2014.12)

(58) Field of Classification Search
CPC ..... B29C 64/10; B29C 64/393; B29C 70/688; B33Y 10/00; B33Y 50/02; B33Y 80/00; G01N 3/30; G06F 30/23
(Continued)

(56) References Cited

U.S. PATENT DOCUMENTS 6,725,656 B2 4/2004 Moore, III et al.
9,274,036 B2 3/2016 Malik et al.
(Continued)

FOREIGN PATENT DOCUMENTS

WO 2006047286 A2 5/2006

OTHER PUBLICATIONS

Li, K. et al., "Optimization of fiber-orientation distribution in fiber-reinforced composite injection molding by Taguchi, back propagation neural network, and genetic algorithm-particle swarm optimization", Advances in Mechanical Engineering, vol. 9(9) pp. 1-11 (2017).
(Continued)

*Primary Examiner* — Matthew J Daniels
*Assistant Examiner* — Yunju Kim
(74) *Attorney, Agent, or Firm* — Christopher G. Darrow; Darrow Mustafa PC (57) ABSTRACT

2-manifold structures are structures having continuously curvilinear surfaces, with no kinks or sharp angles. Methods for building strong, lightweight 2-manifold structures include a computer implemented strength optimization process. The computer implemented process includes a structure optimization sub-routine in which a plurality of rod-like members, constituting an irregular scaffold, is constrained into a volume corresponding to the 2-manifold structure. The strength of the irregular scaffold is then optimized by application of an algorithm that maximizes strength as a function of variations in the ratio of the largest macroscopic dimension of the panel to the average length of the members; the aspect ratio of the members (diameter divided by length); the average or maximum number of times a member can contact another member; and the distribution of member lengths. Strength maximization can be simultaneous to minimization of total length of the members. The process
(Continued)

can includes additional compositional and structural optimizations, prior to fabrication of the irregular scaffold, and encasing of the scaffold in a shell, or infiltration of the scaffold with a matrix material.

16 Claims, 5 Drawing Sheets

(51) Int. Cl.
*B33Y 50/02* (2015.01)
*B33Y 10/00* (2015.01)

(58) Field of Classification Search
USPC .......................................................... 700/117
See application file for complete search history.

(56) References Cited

U.S. PATENT DOCUMENTS

| 2015/0170022 | A1 | 6/2015 | Malik et al. |
| 2015/0265438 | A1* | 9/2015 | Hossainy ................ A61F 2/915 623/1.11 |
| 2017/0259502 | A1 | 9/2017 | Chapiro et al. |
| 2018/0147798 | A1* | 5/2018 | Kolandaivelu ....... B29C 64/295 |

OTHER PUBLICATIONS

Trepanier, M. et al., "Column collapse of granular rods", Phys. Rev. E., 82, Article 011308 (2010).
O'Hern, C. et al., "Granular Materials: Highly evolved grains", Nat. Mater., 12, pp. 287-288 (2013).
Khani, A. et al., "Design of variable stiffness panels for maximum strength using lamination parameters", Composites Part B: Engineering, 42, pp. 546-552 (2011).
Alhijazi et al., "Finite element analysis of natural fibers composites: A review," Nanotechnology Reviews 2020; 9: pp. 853-875 (23 pages).
Jia et al., "Topology Optimization of Orthotropic Material Structure," Materials Science Forums, vols. 575-578 (2008) pp. 978-989 (13 pages).
Qi, A. et al., "Electrophoretic deposition of carbon nanotubes onto carbon-fiber fabric for production of carbon/epoxy composites with improved mechanical properties," Carbon 50 (2012), pp. 4130-4143 (14 pages).
Monte, S. et al., "Optimization of Fibers Orientation in a Composite Specimen," 10th International Conference on Composite Science and Technology (ICCST/10) (2015) (9 pages).
Wang, W. et al., "Micromechanical Modeling of Fiber-Reinforced Composites with Statistically Equivalent Random Fiber Distribution," Materials 2016, 9, 624 (14 pages).
Pham, D.C. et al., "An Optimization Tool for Impact Analysis of Composite Structures," Procedia Engineering 75 2014), pp. 3-8 (6 pages).
Le Riche, R. et al., "Optimization of Laminate Stacking Sequence for Buckling Load Maximization by Genetic Algorithm," AIAA Journal, vol. 31, No. 5 (May 1993) pp. 951-956 (6 pages).

* cited by examiner

ULTRA-STRONG 2-MANIFOLD PANELS BASED ON BIOMIMETIC INSPIRED, ALGORITHMICALLY OPTIMIZED STRUCTURES

TECHNICAL FIELD

The present disclosure generally relates to methods for optimizing the specific strength of materials formed of filamentary elements and, more particularly, to computer systems and methods to optimize structural and compositional parameters of such materials, which include composite materials.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

The development of lightweight, durable materials is beneficial to many industrial and commercial applications, including automotive, airplane, and other transportation technologies. In a generic example, material strength-to-weight improvements have played a significant role in increasing vehicle fuel efficiency and performance. Such strength-to-weight improvement can involve a difficult balance of competing factors, however. Lightweight materials tend to be relatively weak, having low yield strength, or a tendency to be easily deformed when strained. "Strong" materials tend to be heavy, and also to have relatively low tensile strength, or a tendency to fracture when strained. Advances in metallurgy and composite material design have led to improved properties and function, but additional improvements will lead to further benefits.

Birds' nests are generally exceedingly light, but possess remarkable strength. While their design and properties vary depending the species of bird and on available materials, some nests have been shown to have specific strengths that dramatically exceed that of construction-grade steel. Ornithological and mechanical research has begun to determine how the shape; the intertwining of twigs, straw, and other stick-like components; the supplementation with mud or other materials; and other design features translate to the remarkable strength, yet light weight, of birds' nests.

The marriage of birds' nest design concepts with a wider array of materials, and with the guidance of optimization algorithms, has the potential to produce a new type of advanced, lightweight materials and tools for a wide variety of applications.

SUMMARY

This section provides a general summary of the disclosure, and is not a comprehensive disclosure of its full scope or all of its features.

In various aspects, the present teachings provide a method for building a structure having a high specific strength. The method includes a step of performing a computer implemented process for optimizing strength of the structure. The computer implemented process includes a sub-step of defining a 2-manifold surface that is continuously curvilinear, the 2-manifold surface enclosing a containment volume. The computer implemented process also includes a step of constraining an irregular scaffold, formed of a plurality of rod-like members, into the containment volume. The computer implemented process further includes a step of applying a structure optimization algorithm to the irregular scaffold, the algorithm having a variable-structure strength maximization objective function, subject to the following variable structural parameters: $\gamma$: a ratio of a largest macroscopic dimension of the structure to an average length of the members; $\rho$: an average aspect ratio of the members; $\chi$: a value that is either the average or maximum number of times a member can contact another member; and a distribution of member lengths. The applying step generally produces structure-optimized values for the structural parameters. The method for building the structure also includes steps of fabricating the irregular scaffold, such as by 3D printing, and encasing the irregular scaffold in an encapsulating shell.

In other aspects, the present teachings provide a method for building a structure formed of a composite material. The method includes a step of performing a computer implemented process for optimizing strength of the structure. The computer implemented process includes a sub-step of fitting an irregular scaffold, formed of a plurality of rod-like members, to a 2-manifold structure having a continuously curvilinear surface. The computer implemented process further includes a step of applying a structure optimization algorithm to the irregular scaffold, the algorithm having a variable-structure strength maximization objective function, subject to the following variable structural parameters: $\gamma$: a ratio of a largest macroscopic dimension of the structure to an average length of the members; $\rho$: an average aspect ratio of the members; $\chi$: a value that is either the average or maximum number of times a member can contact another member; and a distribution of member lengths. The applying step generally produces structure-optimized values for the structural parameters. The method for building the structure also includes steps of fabricating the irregular scaffold, such as by 3D printing, and infiltrating the irregular scaffold with a matrix material.

Further areas of applicability and various methods of enhancing the disclosed technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings are directed to methods for optimizing and building 2-manifold structures that have very high strength and/or specific strength. Various structures and methods are based on the structures of birds' nests, which can have specific strength greater than that of structural steel.

Methods according to the present teachings mimic the design of a birds' nest by optimizing a 2-manifold structure formed of semi-rigid rod-like members that are analogous to the sticks and twigs that can form a birds' nest. The structure is first topologically optimized according to a strength maximization algorithm, with certain compositional parameters constrained and certain structural parameters varied. This can be followed by a compositional optimization, in which structural parameters are fixed and compositional parameters are varied. The methods can include a topological re-optimization. The result strong, lightweight structure can be built by additive fabrication techniques, and backfilled with a matrix material to form a composite, or wrapped to form an encapsulated structure.

Figure 1:
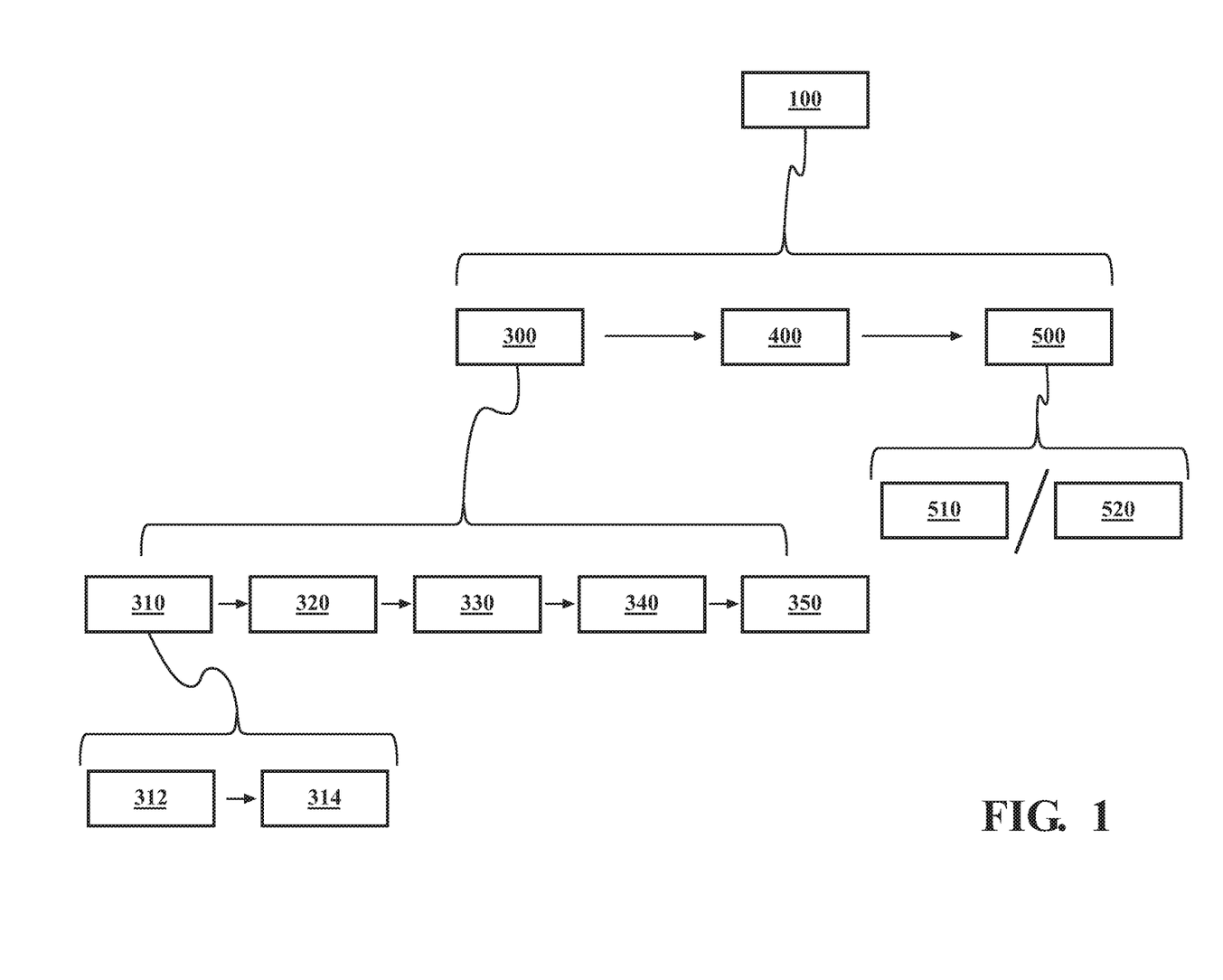
FIG. 1 is a flow-chart of a method for building a 2-manifold structure.
Figure 2A:
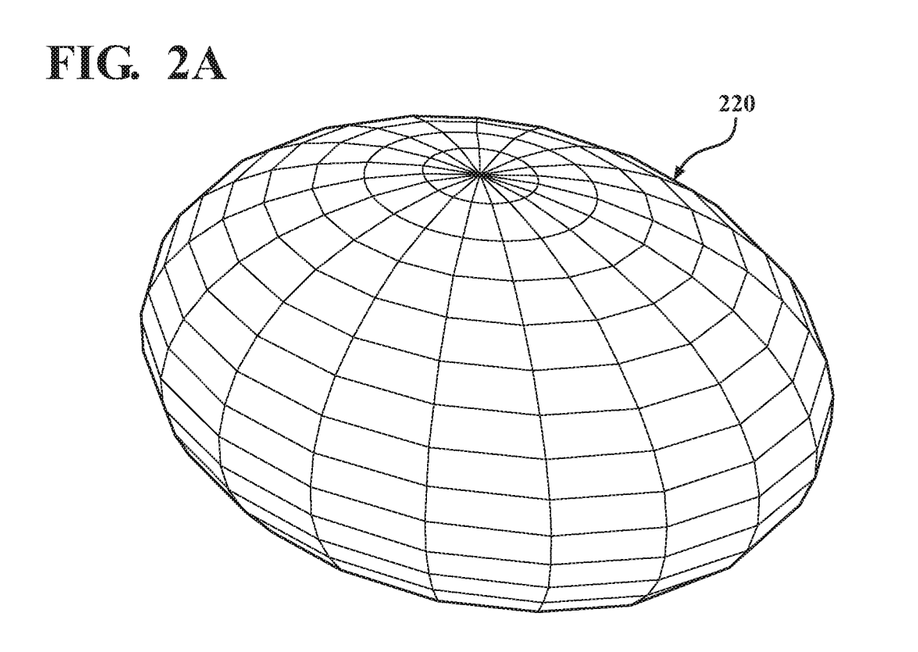
FIG. 2A is a perspective view of an exemplary 2-manifold structure without boundary.
Figure 2B:
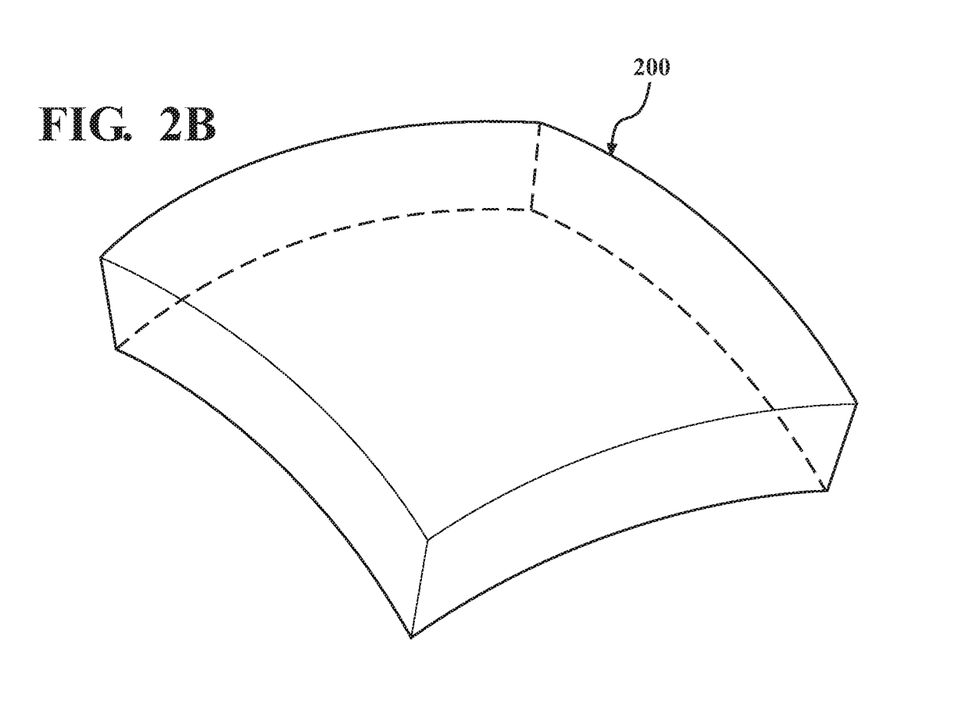
FIG. 2B is a perspective view of an exemplary 2-manifold structure with boundary.
Figure 2C:
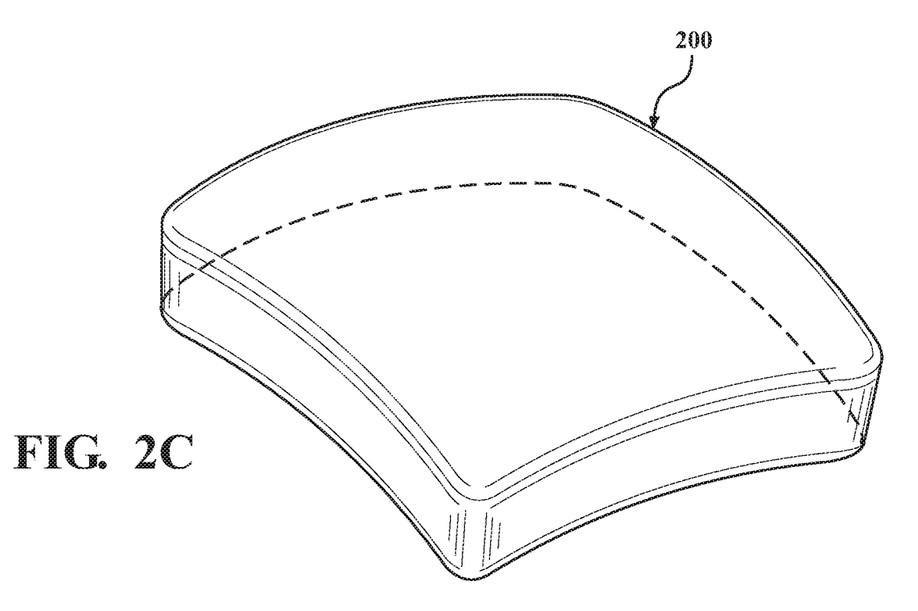
FIG. 2C is a perspective view of the structure of FIG. 2B with rounded edges, thereby forming a 2-manifold structure without boundary.

With reference to FIG. 1, a method 100 of building a 2-manifold structure 200 is disclosed. As used herein, and with reference to FIGS. 2A and 2B, the expression "2-manifold structure" refers to a three-dimensional structure enclosed by a 2-manifold surface, or a surface free of angles and/or sharp kinks. This can also be referred to as a structure having a continuously curvilinear surface. In some implementations, and as shown by example in FIG. 2A, the 2-manifold surface enclosing the 2-manifold structure will be a 2-manifold surface without boundary, such as a sphere, ellipsoid, or bowl shape. In other implementations, the 2-manifold surface will be a 2-manifold surface with boundary, such as a flat or curvilinear planar surface defining a panel, as shown in FIG. 2B. It will be appreciated, however, that structures of the type shown in FIG. 2B, having bounded surfaces, can be made continuously curvilinear over the entire surface by rounding off edges formed by the boundaries, as shown in FIG. 2C.

With reference to FIGS. 3A-3B and 4A-4B, the 2-manifold structure 200 includes an irregular scaffold 210 formed of a plurality of rod-like members 220. A rod-like member 220 is a long, thin semi-rigid structure having a maximum longitudinal dimension, x, and a maximum lateral dimension, y, where x is generally substantially greater than y. Each rod-like member 220 has an aspect ratio, defined as the ratio of the maximum lateral dimension to the maximum longitudinal dimension, or y/x. In many implementations, the rod-like members will be tubular, having a circular lateral contact section, but can also be strips having a rectangular lateral contact section, elliptical tubulars having an oval lateral contact-section, or any other specific shape that can generally be considered rod-like. Rod-like members 220 will generally have uniform composition and diameter (or lateral dimension), but can have varying length (or longitudinal dimension).

Figure 3A:
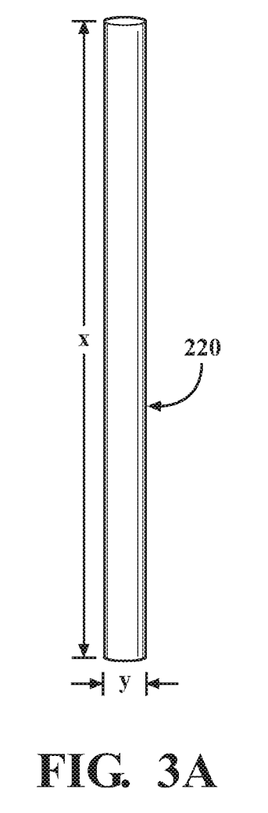
FIGS. 3A and 3B are perspective views of rod-like members.
Figure 3B:
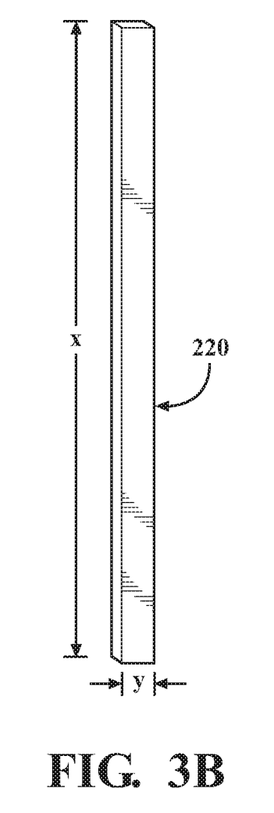
Figure 4A:
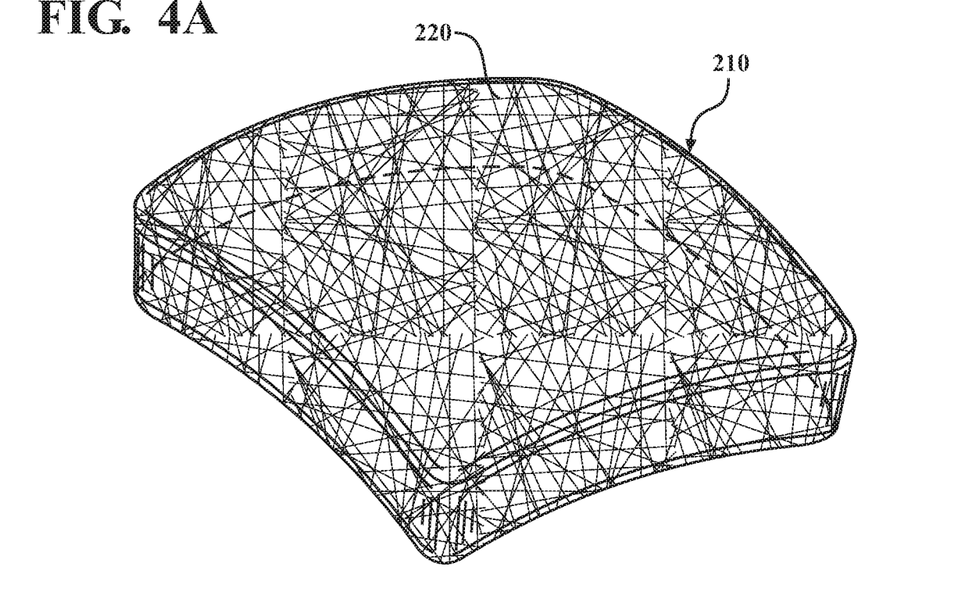
FIG. 4A is a perspective view of an irregular scaffold formed of a plurality of rod-like members such as those shown in FIGS. 3A and 3B.
Figure 4B:
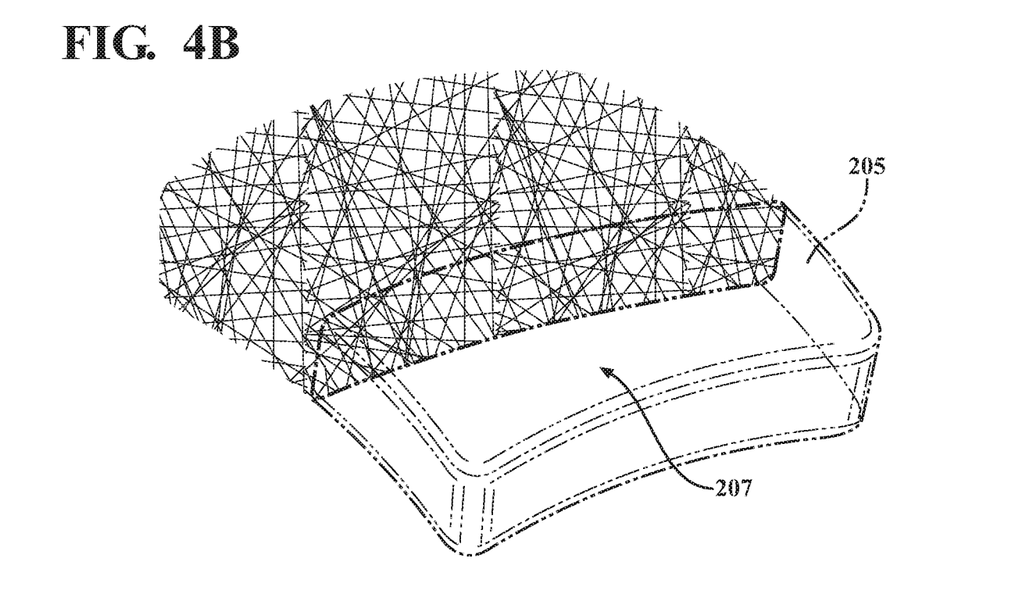
FIG. 4B is a perspective view of the structure of FIG. 4A, with a cutaway to facilitate viewing of the 2-manifold surface and the containment volume.

In different implementations, the average aspect ratio of a plurality of rod-like members 220 can be greater than five; or greater than ten; or greater than fifty; or greater than one hundred. Depending on the application, a plurality of rod-like members 220 can have an average maximum longitudinal dimension, $\bar{x}$, in a range of, from hundreds of microns to a meter or more. In some implementations, such as methods for making composite materials, $\bar{x}$ can be in the range of about one millimeter. In other implementations, such as methods for making steel-reinforced structures, $\bar{x}$ can be in the range of about one decimeter to one meter.

The irregular scaffold 210, composed of a network of contacting or interconnected rod-like members 220, is, in effect, the skeleton of the 2-manifold structure 200. Mimicking the structure of a bird's nest, it provides substantial strength to the 2-manifold structure 200 and, as discussed below, can serve as a support framework for an infiltrating matrix material or an encasing material such as a wrap. The term "irregular" as used herein in the phrase "irregular scaffold" distinguishes from a lattice or a scaffold of repeating structural subunits. The rod-like members 220 are tangled or interconnected, in a seemingly disordered manner, thereby forming the irregular scaffold 210, the latter of which roughly resembles the twigs of a bird's nest, as shown in FIG. 3B. Depending on the application, the irregular scaffold 210 can contain hundreds, thousands, or more of individual rod-like members 220.

With continued reference to FIG. 1, the method 100 includes a computer implemented process 300 for optimizing the strength of the irregular scaffold 210. As used herein, and without limitation, the term "strength" can refer to any of tensile strength, flexural (bending) strength, yield strength, compressive strength, fatigue strength, and impact strength. In some implementations, the computer implemented process 300 can function to maximize the specific strength of the irregular scaffold 210.

The computer implemented process 300 includes a step of fitting 310 the irregular scaffold 210 to a 2-manifold structure 200. The step of fitting 310 can include a first sub-step of defining 312 the 2-manifold surface 205, the 2-manifold surface 205 enclosing a containment volume 207, the 2-manifold surface 205 and containment volume 207 shown in FIG. 4B. The step of fitting 310 the plurality of rod-like members 220 into a panel can then further include a sub-step of constraining 314 the irregular scaffold 210 into the containment volume 207 enclosed by the 2-manifold surface 205. Therefore, each rod-like member 220 in the irregular scaffold 210 is required to remain within the containment volume 207 in the computer implemented process 300.

The irregular scaffold 210 is additionally defined by at least the following structural parameters: (i) the ratio, $\gamma$, of the largest macroscopic dimension of the 2-manifold structure 200 to the average length of the individual rod-like members 220; (ii) the average aspect ratio, $\rho$, of the rod-like members 220; (iii) the average number of times (or maximum number of times), $\chi$, a rod-like member 220 can contact another rod-like member; (iv) the total length of rod-like members 220 (e.g. number of members 220 times average length); and (v) the distribution of member lengths. The distribution of member lengths can be presented in any suitable mathematical formulation. In some implementations, $\chi$ is the average number times that an individual rod-like member contacts other individual rod-like members in the plurality of rod-like members 220. In some implementations, $\chi$ is the maximum number of times that an individual rod-like member can contact other individual rod-like members in the plurality of rod-like members 220. In some variations, $\gamma$ is about one thousand; and $\chi$ is within a range of about two to about five.

In some implementations, the plurality of rod-like members 220 can be characterized by at least one compositional parameter, relating to a mechanical property that can be associated with a material composition. Non-limiting examples of suitable compositional parameters include: Young's modulus, shear modulus, bulk modulus, friction coefficient, strain hardening exponent, yield strength, and density. In some implementations in which the plurality of rod-like members 220 is characterized by two or more compositional parameters, at least two such compositional parameters can be linked by a linear or non-linear relationship that prevents physically implausible combinations. For example, such a linked relationship could make it impermissible for rod-like members 220 to have both a very low density and a very high Young's modulus.

A structure optimization sub-routine includes a step of computationally optimizing 320 the strength of the irregular scaffold 210, while modifying the configuration of the plurality of rod-like members 220, by varying $\gamma$, $\rho$, $\chi$, and the distribution of member lengths. In some implementations, and as further discussed below, the step of optimizing 320 can be performed while additionally modifying the total length of rod-like members. As indicated above, the step of computationally optimizing 320 the strength of the irregular scaffold 210 can, in some implementations, include optimizing the specific strength of the irregular scaffold 210. The step of computationally optimizing 320 the strength of the irregular scaffold 210 can be performed using any suitable optimization algorithm configurable to calculate strength (or strength-to-weight) of a structure as an objective function having variable parameters of $\gamma$, $\rho$, $\chi$, and the distribution of member lengths, as described above. The step of computationally optimizing 320 will generally involve an algorithm configured to iteratively modify the location, orientation, and shape of the individual rod-like members of the plurality of rod-like members 220, according to the structural or topological parameters described above, and to calculate the strength of the irregular scaffold 210 in response to each iterative adjustment.

In some implementations, this will be a single-objective optimization, in which the objective function is a strength maximization function having the structural parameters described above. In some implementations, this will be a multi-objective optimization having a strength maximization objective function and an objective function to minimize the total length of rod-like members 220, as mentioned above. Without limitations, such algorithms can include combinatorial optimization; dynamic programming; evolutionary algorithms; gradient methods; metaheuristics; and stochastic optimization approaches. In particular, these may include Finite Element Analysis; Discrete Element Analysis: genetic algorithms; and nature-inspired metaheuristics; such as swarm intelligence, ant colony optimization algorithms, bee colony algorithms, dual-phase evolution, etc. In many implementations, multiple such algorithms will be used in combination. For example, a Finite Element Analysis can be used to train a Neural Network, so that the Neural Network can operate as an objective function within a bee colony algorithm.

The step of computationally optimizing 320 the strength of the irregular scaffold 210 produces a scaffold having a maximized strength (or specific strength) based on optimization of the aforementioned configurational parameters. After performance of the optimizing 320 step, each of the structural parameters described above can be considered to have an optimized value. In some implementations of the structure optimization sub-routine, the at least one compositional parameter will be constrained to a pre-determined value, or narrow value range, for each compositional parameter. For example, if there are two or more compositional parameters, each can be independently constrained to a pre-determined value, or narrow value range. Therefore, in such implementations, the optimizing 320 step produces a structure having a maximized strength (or specific strength) within the above-referenced structural parameters, but that is not optimized with respect to the given compositional parameter or parameters.

The computer implemented process 300 for optimizing the strength of an irregular scaffold 210 can thus also include a step of computationally improving 330 the strength (or specific strength) of the irregular scaffold 210 while varying the at least one compositional parameter of the plurality of rod-like members 220. During the improving 330 step, each of the structural parameters listed above can be held constant at its optimized value.

Like the optimizing 320 step, the improving 330 step can be performed using any suitable optimization algorithm configurable to calculate specific strength of a structure as an objective function subject to variable compositional parameters. In many implementations, the optimization algorithm or algorithms used in the improving 330 step will be the same as that or those used in the optimizing 320 step. Thus, the optimization algorithm used in the improving 330 step can be a single-objective optimization, but can alternatively be a multi-objective optimization, however it will have an objective function to maximize strength with the at least one compositional parameter as variable parameter(s). Upon completion of the improving 330 step, the value of each of the at least one compositional parameters can be considered to be composition-optimized.

The computer implemented process 300 can include a step of selecting 340 a real material. Such a real material chosen during the selecting step will be one that has real compositional parameters that are similar in value to the composition-optimized values that are obtained from the improving 330 step. For example, if the improving 330 step produces a value, E, for Young's modulus and a value, F, for friction coefficient, the selecting 340 step could be performed by selecting a real material having Young's modulus of E±10% and friction coefficient of F±10%. The step of selecting 340 a real material can be performed manually—i.e. by a person utilizing the method—or automatically—by a machine querying a database of real materials to obtain a close match to the composition-optimized values for the compositional parameters.

The computer implemented process 300 can include a structure re-optimizing 350 step, that is substantially a repetition of the optimizing 320 sub-step, that can be performed after completion of the step of selecting 340 a real material. However, whereas the value of the at least one compositional parameter can be held constant at any predetermined value(s) during performance of the optimizing 320 sub-step, the value of the at least one compositional parameter will be held constant at either: (i) the composition-optimized value(s), derived from the improving 330 step; or (ii) the real compositional values of the real material selected in the selecting 340 step. Completion of the computer implemented process 300 results in an irregular scaffold 210 that is structurally optimized, and potentially also composition-optimized.

It will be understood that, in implementations in which the composition of the irregular scaffold 210 is predetermined, or limited to a relatively small number of similar materials, it may be desirable to end the computer implemented process 300 after completion of the optimizing 320 step, the improving 330 step, or the selecting 340 step. Thus, the computer implemented process 300 can consist only of the fitting 310 and optimizing 320 steps, for example. Or the computer implemented process 300 can consist only of the fitting 310, optimizing 320, and improving 330 steps.

The method 100 of building a 2-manifold structure 200 includes a step of fabricating 400 the irregular scaffold 210, after completion of the optimization process 110. The fabricating 400 step can be performed, for example, by additive fabrication techniques (e.g. "3D printing") or by manipulating and weaving a plurality of preformed elongated members into the structure produced by the computer implemented process 300.

Figure 5A:
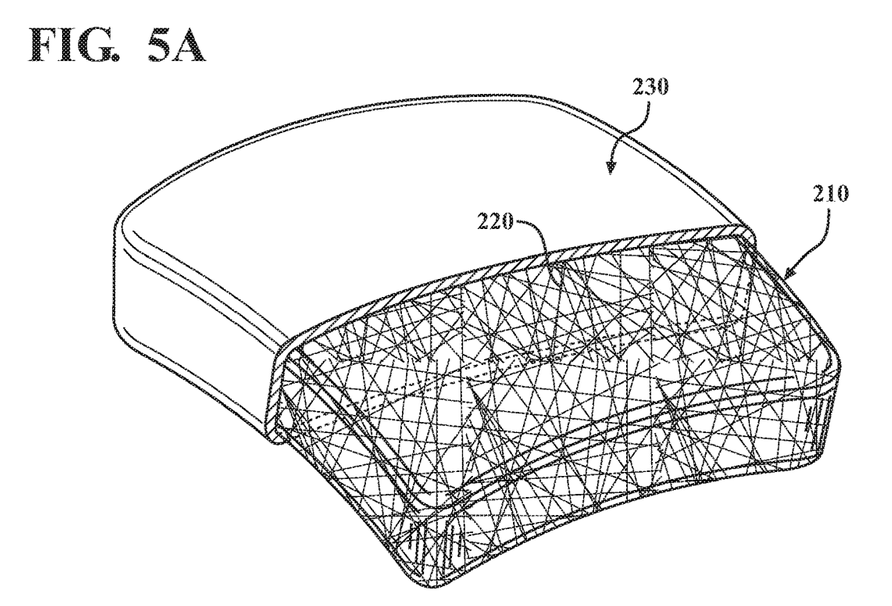
FIG. 5A is a perspective view of the irregular scaffold of FIG. 4A, partially covered with an encapsulating shell.
Figure 5B:
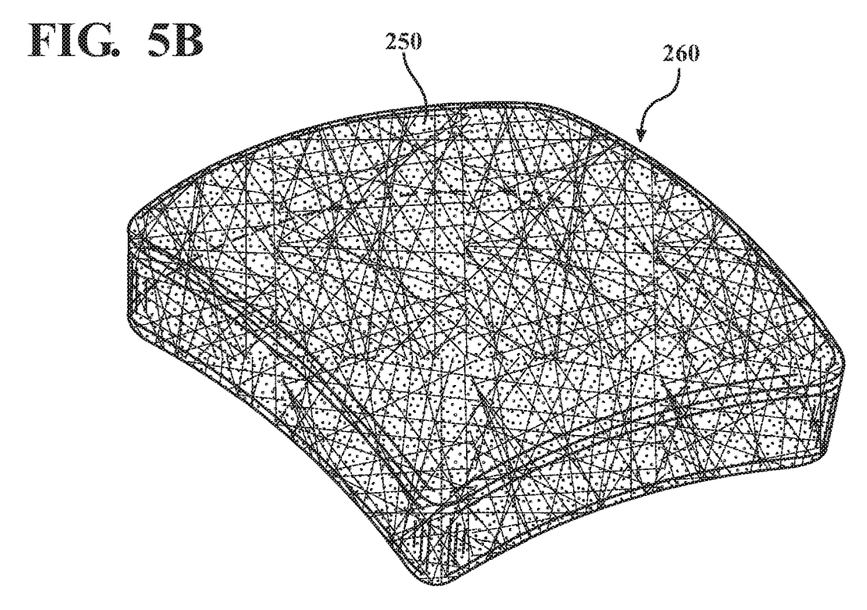
FIG. 5B is a perspective view of a composite material including an irregular scaffold of FIG. 4A.

The method 100 of building a 2-manifold structure 200 includes a step of finishing 500 the structure. This can be performed by a step of encasing 510 the fabricated irregular scaffold 210 in an encapsulating shell 230, shown in FIG. 5A. The encapsulating shell 230 generally has the shape of the 2-manifold surface 205 that can be defined as part of the fitting 310 step. The encapsulating shell 230 can be made of any suitable material, including without limitation a thermoplastic, a metal, a ceramic, or any other material. The encapsulating shell 230 can include one or more preformed sheets to be wrapped around the irregular scaffold 210, or can be formed in place around the irregular scaffold 210. Alternatively or in addition, the finishing 130 step can include a step of infiltrating 520 the irregular scaffold 210 with a matrix material 250, to produce a composite material 260, shown in FIG. 5B. In the infiltrating 520 step, all void spaces in the irregular scaffold 210 are filled with the matrix material 250.

It will therefore be appreciated that the method 100 of building a 2-manifold structure 200 can, in some implementations, be a method of building a part formed of a composite material 260. For example, the optimized irregular scaffold 210 can, in the fabricating 120 step, be 3D printed in carbon fiber, fiberglass, an aramid fiber such as Kevlar, basalt, or another filamentous material suitable for a composite material. The optimized irregular scaffold 210 can then, during the infiltrating 520 step, be back-filled with a thermoplastic or thermosetting polymer composition to form a composite material 260. Without limitation suitable matrix materials 250 can include an epoxy, a vinyl ester, a polyester thermosetting plastic, and a phenol formaldehyde resin. Matrix materials 250 can be selected for compositional properties similar to the compositional parameters described above, in relation to the optimization process 110.

Similarly, the optimized irregular scaffold 210 can, in the fabricating 120 step, be formed of rebar or a comparable reinforcing component. The irregular scaffold 210 can then be impregnated during the infiltrating 520 step with concrete, to form a reinforced concrete structure, which can be regarded as a type of composite material.

Example: Algorithm for Random Placement Space Frames Based on Bird Nest Data

{Model parameters} M{ }
$\chi$:=average number of crossings per member
$\lambda$:=average length of member
d:=average diameter of member
E:=modulus of elasticity of member
$\mu$:=static coefficient of friction of member
$\rho$:=ratio of length to diameter of member
n:=number of members in a model
L:=total length of members
w:=longest dimension of shape
h:=longest dimension perpendicular to w Data Libraries
$B\{N_i;m\{pi\}\}$:=Complete set of nests, S, with every nest, N, defined by the parameters above (average length, etc.) m{ } such that every $p_i$ is the value of a specific nest $N_i$ Block 1
1) User defined volume or shape, V, characterized by w, h
2) Set of defined loads applied to shape, assuming uniform loading across the surface that stress is applied to Block 2 [search B]
1) Find all $N_i$ where $|(h_M-h_m)/(h_M+h_m)|<e_h$ and $|(w_M-w_m)/(w_M+w_m)|<e_w$ where $e_{h,w}$ is a user defined limit of dimensional difference between the user defined shape and the real nest data
2) Store [search B] as $B_i$ with x nests Block 3 [Find Optimized M{ }]
1) Do
   Compile a distribution from $B_i$ of all parameters in $m_x\{\}$
   1. For j=1 to m{n}
      Place the $j^{th}$ member randomly in V where the $j^{th}$ member has parameters randomly chosen from distributions in m{ } subject to the constraint that the parameters cannot exceed 5 standard deviations from the mean values of any $p_i$
   2. Calculate the deflection of the assembled structure;
   3. Divide the deflection by L to get $\forall$;
   4. Store the ratio of deflection to L;
   5. Add the new structure to B{ };
   Until $\forall$ converges to the lowest value
2) The calculated set M{ } is written to an output database to be used in fabrication of V It will be appreciated that the Example algorithm includes definitions of structural parameters and compositional parameters, as described above. Block 1 defines dimensions of the shape (i.e. the 2-manifold structure 200), which, in combination with the average member length $\lambda$, provides the ratio $\gamma$. Block 1 further defines loads that will be used to test strength of each iteration of irregular scaffold 210. Block 2 defines the group of irregular scaffolds that fit to the dimensions of the 2-manifold structure 200, and includes an optional degree of macroscopic dimensional variance between the irregular scaffold 210 and the 2-manifold structure 200. Block 2 thus includes the sub-step of constraining 314 the irregular scaffold 210 into the containment volume 207 enclosed by the 2-manifold surface 205, for the set of nests. Block 3 optimizes strength-to-weight ratio of the structure by applying the load iteratively to structures across the distribution of all parameters within the constrained structure set, and finding the structure with maximum ratio of strength (i.e. low deflection under load) to total member length.

It will be appreciated that the Example presented here allows for the option of optimizing structure simultaneously as a function of structural parameters and compositional parameters. However, and as described above, in many instances the structural and compositional optimizations will be performed separately.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A method for building a structure having a high specific strength, the method comprising:
    performing a computer implemented process for optimizing strength of the structure, the process comprising:
        defining a 2-manifold surface that is continuously curvilinear, the 2-manifold surface enclosing a containment volume;
        providing a database of irregular scaffolds, each irregular scaffold formed of a plurality of rod-like members constrained within the containment volume, the irregular scaffolds of the database comprising variations of at least the following variable structural parameters:
        $\gamma$: a ratio of a largest macroscopic dimension of the structure to an average length of the members;
        $\rho$: an average aspect ratio of the members;
        $\chi$: a value selected from the group comprising:
        an average number of times a member can contact another member; and
        a maximum number of times a member can contact another member; and
        a distribution of member lengths,
        defining a load to be applied to individual irregular scaffolds in the database;
        applying an algorithm, configured to calculate deflection of the structure in response to the load, to at least a subset of the database;
        selecting an irregular scaffold on the basis of calculated deflection;
    fabricating the selected irregular scaffold; and
    encasing the fabricated irregular scaffold in an encapsulating shell.

2. The method as recited in claim 1, wherein the step of selecting an irregular scaffold comprises selecting an irregular scaffold having a minimum ratio of deflection to total member length.

3. The method as recited in claim 1, wherein the irregular scaffolds of the database include at least one compositional parameter having a fixed value, the at least one compositional parameter selected from the group consisting of: Young's modulus; shear modulus; bulk modulus; friction coefficient; strain hardening exponent; yield strength; and density.

4. The method as recited in claim 3, wherein the computer implemented process for optimizing strength of the structure further includes a composition optimization sub-routine comprising:
    applying a composition optimization algorithm to the irregular scaffold, the algorithm having a variable-composition strength maximization objective function, subject to the structural parameters held constant at optimized values, and subject to the at least one compositional parameter as a variable,
    wherein applying the composition optimization algorithm produces composition-optimized values for the at least one compositional parameter.

5. The method as recited in claim 4, wherein the computer implemented process for optimizing strength of the structure further comprises:
    re-applying the algorithm to each irregular scaffold of the database or subset thereof, the algorithm subject to the at least one compositional parameter held constant at the respective composition-optimized value.

6. The method as recited in claim 1, wherein the step of fabricating the irregular scaffold is performed by 3D printing.

7. The method as recited in claim 1, wherein encasing comprises wrapping one or more preformed sheets around the irregular scaffold.

8. A method for building a structure formed of a composite material, the method comprising:
- performing a computer implemented process for optimizing strength of the structure, the process including a structure optimization sub-routine comprising:
- providing a database of irregular scaffolds, each irregular scaffold formed of a plurality of rod-like members constrained within a containment volume, the irregular scaffolds of the database comprising variations of at least the following variable structural parameters:
- $\gamma$: a ratio of a largest macroscopic dimension of the structure to an average length of the members;
- $\rho$: an average aspect ratio of the members;
- $\chi$: a value selected from the group comprising:
- an average number of times a member can contact another member; and
- a maximum number of times a member can contact another member; and
- a distribution of member lengths,
- defining a load to be applied to individual irregular scaffolds in the database;
- applying an algorithm, configured to calculate deflection of the structure in response to the load, to at least a subset of the database;
- selecting an irregular scaffold on the basis of calculated deflection;
- fabricating the selected irregular scaffold; and
- infiltrating the fabricated irregular scaffold with a matrix material.

9. The method as recited in claim 8, wherein the step of selecting the irregular scaffold comprises selecting an irregular scaffold having a minimum ratio of deflection to total member length.

10. The method as recited in claim 8, wherein the irregular scaffolds of the database include at least one compositional parameter having a fixed value, the at least one compositional parameter selected from the group consisting of: Young's modulus; shear modulus; bulk modulus; friction coefficient; strain hardening exponent; yield strength; and density.

11. The method as recited in claim 10, wherein the computer implemented process for optimizing strength of the structure further includes a composition optimization sub-routine comprising:
- applying a composition optimization algorithm to the irregular scaffold, the algorithm having a variable-composition strength maximization objective function, subject to the structural parameters held constant at optimized values, and subject to the at least one compositional parameter as a variable,
- wherein applying the composition optimization algorithm produces composition-optimized values for the at least one compositional parameter.

12. The method as recited in claim 11, wherein the computer implemented process for optimizing strength of the structure further comprises:
- re-applying the algorithm to each irregular scaffold of the database or subset thereof, the algorithm subject to the at least one compositional parameter held constant at the respective composition-optimized value.

13. The method as recited in claim 8, wherein the step of fabricating the irregular scaffold is performed by 3D printing.

14. The method as recited in claim 8, wherein the step of fabricating the irregular scaffold comprises fabricating the irregular scaffold from a material selected from the group consisting of: carbon fiber, fiberglass, an aramid fiber, and basalt.

15. The method as recited in claim 8, wherein the step of infiltrating the irregular scaffold with a matrix material comprises infiltrating the irregular scaffold with a matrix material selected from the group consisting of: an epoxy, a vinyl ester, a polyester thermosetting plastic, and a phenol formaldehyde resin.

16. A method for building a structure having a high specific strength, the method comprising:
- performing a computer implemented process for optimizing strength of the structure, the process comprising:
- defining a 2-manifold surface that is continuously curvilinear, the 2-manifold surface enclosing a containment volume;
- providing a database of irregular scaffolds, each irregular scaffold formed of a plurality of rod-like members constrained within the containment volume, the irregular scaffolds of the database comprising variations of at least the following variable structural parameters:
- $\gamma$: a ratio of a largest macroscopic dimension of the structure to an average length of the members;
- $\rho$: an average aspect ratio of the members;
- $\chi$: a value selected from the group comprising:
- an average number of times a member can contact another member; and
- a maximum number of times a member can contact another member; and
- a distribution of member lengths,
- defining a load to be applied to individual irregular scaffolds in the database;
- applying an algorithm, configured to calculate deflection of the structure in response to the load, to at least a subset of the database;
- selecting an irregular scaffold on the basis of calculated deflection;
- fabricating the selected irregular scaffold by 3D printing; and
- infiltrating the irregular scaffold with a matrix material selected from the group consisting of: an epoxy, a vinyl ester, a polyester thermosetting plastic, and a phenol formaldehyde resin.

* * * * *

UNITED STATES PATENT AND TRADEMARK OFFICE
CERTIFICATE OF CORRECTION

PATENT NO. : 11,220,059 B2  Page 1 of 1
APPLICATION NO. : 15/882436
DATED : January 11, 2022
INVENTOR(S) : Abraham S. Anapolsky It is certified that error appears in the above-identified patent and that said Letters Patent is hereby corrected as shown below:

In the Specification

Column 3, Line 5: delete "encapsulating shell, and" and insert -- encapsulating shell; and --

Column 4, Line 13: delete "dimension, $\overline{x}$," and insert -- dimension, $\bar{x}$, --

Column 4, Line 15: delete "materials, $\overline{x}$" and insert -- materials, $\bar{x}$ --

Column 4, Line 17: delete "structures, $\overline{x}$" and insert -- structures, $\bar{x}$ --

Column 5, Line 62: delete "Discrete Element Analysis:" and insert -- Discrete Element Analysis; --

Column 8, Line 16: delete "{pi}" and insert -- {$p_i$} --

Column 8, Line 37: delete "m{ }" and insert -- $m_x${} --

Column 8, Line 42: delete "L to get $\forall$;" and insert -- L to get $\nabla$; --

Column 8, Line 45: delete "Until $\forall$" and insert -- Until $\nabla$ --

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*